US012755485B2

(12) United States Patent
Breugelmans et al.

(10) Patent No.: US 12,755,485 B2
(45) Date of Patent: Oct. 6, 2026

(54) APPARATUS AND METHOD FOR LOCALISATION AND MAPPING

(71) Applicant: Sony Interactive Entertainment Inc., Tokyo (JP)

(72) Inventors: Mark Jacobus Breugelmans, London (GB); Calum Armstrong, London (GB); Maurizio Cerrato, London (GB)

(73) Assignee: Sony Interactive Entertainment Inc., Tokyo (JP)

( * ) Notice: Subject to any disclaimer, the term of this patent is extended or adjusted under 35 U.S.C. 154(b) by 646 days.

(21) Appl. No.: 17/964,985

(22) Filed: Oct. 13, 2022

(65) Prior Publication Data

US 2023/0122636 A1 Apr. 20, 2023

(30) Foreign Application Priority Data

Oct. 20, 2021 (GB) ..................................... 2114995

(51) Int. Cl.
*G06T 17/05* (2011.01)
*G02B 27/01* (2006.01)
(Continued)

(52) U.S. Cl.
CPC .......... *G06T 17/05* (2013.01); *G02B 27/0172* (2013.01); *G06T 7/62* (2017.01);
(Continued)

(58) Field of Classification Search
CPC .. G06T 17/05; G06T 7/62; G06T 7/70; G06T 2207/20101; G06T 2207/30204;
(Continued)

(56) References Cited

U.S. PATENT DOCUMENTS 11,321,914 B1 * 5/2022 Fotland .................. G06T 7/579
2019/0026888 A1 * 1/2019 Beveridge ............. A61B 6/481
(Continued)

OTHER PUBLICATIONS

Extended European Search Report for corresponding EP Application No. 22198197.0, 12 pages, dated Mar. 16, 2023.
(Continued)

*Primary Examiner* — Jennifer Mehmood
*Assistant Examiner* — Pardis Sohraby
(74) *Attorney, Agent, or Firm* — Kilpatrick Townsend & Stockton LLP

(57) ABSTRACT

A data processing apparatus includes receiving circuitry to receive a plurality of images of an environment captured from respective different viewpoints, detection circuitry to detect a plurality of feature points in the plurality of captured images and to associate image information with each detected feature point indicative of an image property for a detected feature point, where each detected feature point represents a candidate landmark point for mapping the environment, selection circuitry to select one or more of the plurality of candidate landmark points, the one or more selected landmark points corresponding to a subset of the plurality of candidate landmark points, and mapping circuitry to generate, for the environment, a map including one or more of the selected landmark points, where each landmark point included in the map is defined by a three dimensional position and the associated image information for that landmark point.

20 Claims, 6 Drawing Sheets

(51) Int. Cl.
*G06T 7/62* (2017.01)
*G06T 7/70* (2017.01)
*G06V 10/44* (2022.01)
*G06V 10/764* (2022.01)

(52) U.S. Cl.
CPC ................ *G06T 7/70* (2017.01); *G06V 10/44* (2022.01); *G06V 10/764* (2022.01); *G06T 2207/20101* (2013.01); *G06T 2207/30204* (2013.01)

(58) Field of Classification Search
CPC . G06T 2207/20092; G06T 2207/20104; G06T 2207/30244; G06T 7/74; G06T 7/73; G06T 19/006; G06V 10/44; G06V 10/764; G02B 27/0172
USPC .......................................................... 382/154
See application file for complete search history.

(56) References Cited

U.S. PATENT DOCUMENTS

| | | | | |
|---|---|---|---|---|
| 2019/0259170 | A1* | 8/2019 | Qi | G06T 7/73 |
| 2020/0234456 | A1* | 7/2020 | Mita | G06V 10/44 |
| 2021/0110137 | A1* | 4/2021 | Kerzner | G06F 18/2413 |
| 2021/0125397 | A1* | 4/2021 | Moulon | G06T 17/00 |
| 2021/0366082 | A1* | 11/2021 | Xiao | G06T 11/00 |

OTHER PUBLICATIONS

Combined Search and Examination Report for corresponding GB Application No. 2114995.0, 14 pages, dated Jul. 4, 2022.

Munoz-Salinas, et al., "UcoSLAM: Simultaneous Localization and Mapping by Fusion of KeyPoints and Squared Planer Markers" Pattern Recognition, vol. 101, 18 pages, C'ordoba, Spain, Feb. 12, 2019 (for relevance, see Non-Pat. Lit. #1).

Masaya Kaneko, et al., "Mask-SLAM: Robust Feature-Based Monocular SLAM by Masking Using Semantic Segmentation" 2018 IEEE/CVF Conference on Computer Vision and Pattern Recognition Workshops, pp. 371-379, Tokyo, Japan, Jun. 1, 2018 (for relevance, see Non-Pat. Lit. #1).

* cited by examiner

APPARATUS AND METHOD FOR LOCALISATION AND MAPPING

BACKGROUND OF THE INVENTION

Field of the Disclosure

The present disclosure relates to localisation and mapping.

Description of the Prior Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present disclosure.

In some computer vision applications, there is a requirement to be able to process the 3-D position of image features captured by a 2-D camera. One example situation is found in robotics, in that a robot using computer vision may need to be able to map its environment and also know its own location with respect to that environment. Another example situation occurs in videogames, in that, for example, a hand-held or head-mounted gaming device having a camera built into the device can be used to capture images of the real surroundings, onto which so-called augmented reality (AR) image features can be rendered for display to a user. For example, a gaming device may capture an image of a real building, but this is displayed to the user with an animal, superhero or other image rendered so as to be climbing up the side of the building.

In order to achieve this sort of AR rendering, the gaming device needs to be able to derive the orientation of the side of the building and an indication of its scale which may be derived as an indication of its relative distance from the camera compared to other captured image features. In order to place augmentation on a building while continuously tracking a moving camera the following is required: camera orientation and position for a captured image frame, and constant plane equation for the building side.

It is possible to use so-called AR markers to assist in this process. These are predetermined patterns (for example, printed on cards which the user may position in space) which the gaming device can recognise for their size in the image (an indication of scale) and orientation. However, in other arrangements it is undesirable or impractical to use AR markers. This is particularly the case where the real objects which are being augmented by the AR graphics are large or not directly accessible by the user. Also, it can be inconvenient for the user to have to carry and position the AR markers before playing a game. So, in such cases the gaming device generally has no a priori indication of either its own position in space or of the position in space of any of the objects which its camera is capturing.

Techniques have therefore been proposed, generically called "simultaneous localisation and mapping" (SLAM) in which the problems of building a map of a camera's environment and determining the position in space of the camera itself are bound together in a single iterative process. Accordingly, SLAM attempts to build a map or model of an unknown scene and estimate a camera position within that map.

It is an aim to provide improved localisation, mapping and virtual/augmented reality arrangements.

It is in the context of the above arrangements that the present disclosure arises.

SUMMARY OF THE INVENTION

Various aspects and features of the present disclosure are defined in the appended claims and within the text of the accompanying description. Example embodiments include at least a system, a method, a computer program and a machine-readable, non-transitory storage medium which stores such a computer program.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE EMBODIMENTS

In the following description, a number of specific details are presented in order to provide a thorough understanding of the embodiments of the present invention. It will be apparent, however, to a person skilled in the art that these specific details need not be employed to practice the present invention. Conversely, specific details known to the person skilled in the art are omitted for the purposes of clarity where appropriate.

Figure 1:
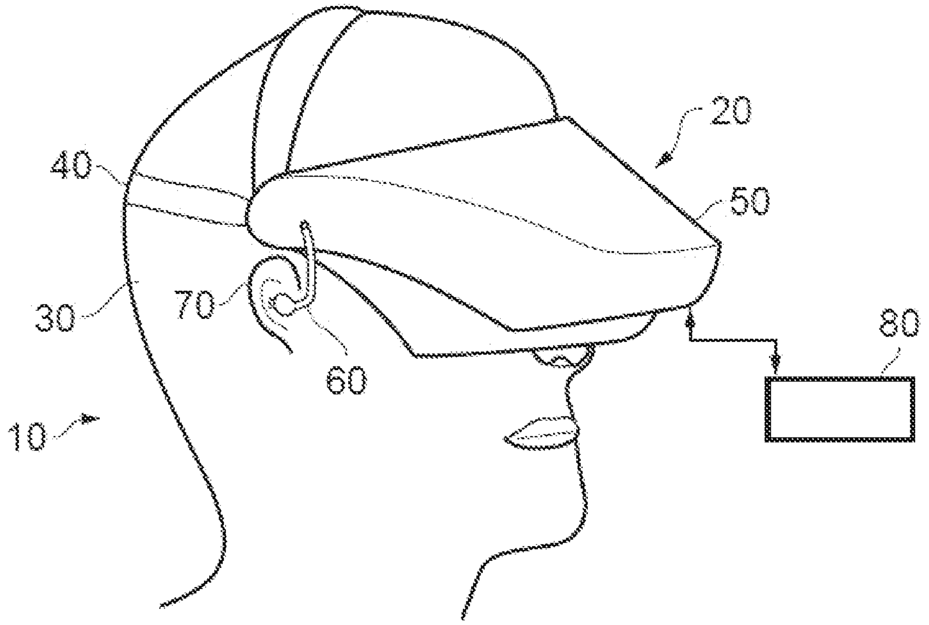
FIG. 1 schematically illustrates a head-mountable display apparatus (HMD) worn by a user.

Referring now to the drawings, wherein like reference numerals designate identical or corresponding parts throughout the several views, in FIG. 1 a user 10 is wearing an HMD 20 (as an example of a generic head-mountable apparatus—other examples including audio headphones or a head-mountable light source) on the user's head 30. The HMD comprises a frame 40, in this example formed of a rear strap and a top strap, and a display portion 50. As noted above, many gaze tracking arrangements may be considered particularly suitable for use in HMD systems; however, use with such an HMD system should not be considered essential.

Note that the HMD of FIG. 1 may comprise further features, to be described below in connection with other drawings, but which are not shown in FIG. 1 for clarity of this initial explanation.

The HMD of FIG. 1 completely (or at least substantially completely) obscures the user's view of the surrounding environment. All that the user can see is the pair of images displayed within the HMD, as supplied by an external processing device such as a games console in many embodiments. Of course, in some embodiments images may instead (or additionally) be generated by a processor or obtained from memory located at the HMD itself.

The HMD has associated headphone audio transducers or earpieces 60 which fit into the user's left and right ears 70. The earpieces 60 replay an audio signal provided from an external source, which may be the same as the video signal source which provides the video signal for display to the user's eyes.

The combination of the fact that the user can see only what is displayed by the HMD and, subject to the limitations of the noise blocking or active cancellation properties of the earpieces and associated electronics, can hear only what is provided via the earpieces, mean that this HMD may be considered as a so-called "full immersion" HMD. Note however that in some embodiments the HMD is not a full immersion HMD, and may provide at least some facility for the user to see and/or hear the user's surroundings. This could be by providing some degree of transparency or partial transparency in the display arrangements, and/or by projecting a view of the outside (captured using a camera, for example a camera mounted on the HMD) via the HMD's displays, and/or by allowing the transmission of ambient sound past the earpieces and/or by providing a microphone to generate an input sound signal (for transmission to the earpieces) dependent upon the ambient sound.

One or more image sensors can be provided as part of the HMD (not shown in FIG. 1), such as one or more front-facing cameras arranged to capture one or more images to the front of the HMD. The one or more image sensors can comprise one or more of an RGB image sensor and an infrared (IR) image sensor. Such images may be used for head tracking purposes, in some embodiments, while it may also be suitable for capturing images for an augmented reality (AR) style experience.

A Bluetooth® antenna may provide communication facilities or may simply be arranged as a directional antenna to allow a detection of the direction of a nearby Bluetooth® transmitter.

In operation, a video signal is provided for display by the HMD. This could be provided by an external video signal source 80 such as a video games machine or data processing apparatus (such as a personal computer or the PS5®), in which case the signals could be transmitted to the HMD by a wired or a wireless connection. Examples of suitable wireless connections include Bluetooth® connections and an example of suitable wired connections include High Definition Multimedia Interface (HDMI®) and DisplayPort®. Audio signals for the earpieces 60 can be carried by the same connection. Similarly, any control signals passed between the HMD to the video (audio) signal source may be carried by the same connection. Furthermore, a power supply (including one or more batteries and/or being connectable to a mains power outlet) may be linked by a wired connection to the HMD. Note that the power supply and the video signal source 80 may be separate units or may be embodied as the same physical unit. There may be separate cables for power and video (and indeed for audio) signal supply, or these may be combined for carriage on a single cable (for example, using separate conductors, as in a USB cable, or in a similar way to a "power over Ethernet" arrangement in which data is carried as a balanced signal and power as direct current, over the same collection of physical wires). The video and/or audio signal may in some examples be carried by an optical fibre cable. In other embodiments, at least part of the functionality associated with generating image and/or audio signals for presentation to the user may be carried out by circuitry and/or processing forming part of the HMD itself. In some cases, a power supply may be provided as part of the HMD itself.

Some embodiments of the invention are applicable to an HMD having at least one cable linking the HMD to another device, such as a power supply and/or a video (and/or audio) signal source. So, embodiments of the invention can include, for example:

(a) an HMD having its own power supply (as part of the HMD arrangement) but a wired connection (also referred to as a cabled connection) to a video and/or audio signal source;

(b) an HMD having a wired connection to a power supply and to a video and/or audio signal source, embodied as a single physical cable or more than one physical cable;

(c) an HMD having its own video and/or audio signal source (as part of the HMD arrangement) and a wired connection to a power supply; or (d) an HMD having a wireless connection to a video and/or audio signal source and a wired connection to a power supply.

If one or more cables are used, the physical position at which the cable enters or joins the HMD is not particularly important from a technical point of view. Aesthetically, and to avoid the cable(s) brushing the user's face in operation, it would normally be the case that the cable(s) would enter or join the HMD at the side or back of the HMD (relative to the orientation of the user's head when worn in normal operation). Accordingly, the position of the cables relative to the HMD in FIG. 1 should be treated merely as a schematic representation. Accordingly, the arrangement of FIG. 1 provides an example of a head-mountable display comprising a frame to be mounted onto an observer's head, the frame defining one or two eye display positions which, in use, are positioned in front of a respective eye of the observer and a display element mounted with respect to each of the eye display positions, the display element providing a virtual image of a video display of a video signal from a video signal source to that eye of the observer.

FIG. 1 shows just one example of an HMD. Other formats are possible: for example an HMD could use a frame more similar to that associated with conventional eyeglasses, namely a substantially horizontal leg extending back from the display portion to the top rear of the user's ear, possibly curling down behind the ear. In other (not full immersion) examples, the user's view of the external environment may not in fact be entirely obscured; the displayed images could be arranged so as to be superposed (from the user's point of view) over the external environment.

The HMD as shown in FIG. 1 thus provides an example of a mobile electronic device comprising one or more image sensors for capturing images of a surrounding environment. When worn by a user, the image sensors can thus capture a plurality of images of the surrounding environment from respective different viewpoints and the plurality of images can be used for simultaneous localisation and mapping for the surrounding environment.

Whilst examples of the present disclosure will be described with reference to an HMD, which represents an example of a mobile electronic device, the embodiment of the present disclosure are not limited to an HMD and can be performed for any mobile electronic device comprising one or more images sensors, of which examples include: handheld devices (e.g. a smartphone), robotic devices and autonomous cars. For example, as a robotic device navigates a surrounding environment, one or more image sensors mounted on the robotic device can capture a plurality of images of the surrounding environment from respective different viewpoints and the captured images can be used for simultaneous localisation and mapping for the surrounding environment.

Before discussing the techniques of the present disclosure, some terminology will be introduced by discussing a conventional tracking and mapping process using images of an environment.

In a tracking and mapping process, images of a scene in three-dimensional space are captured from different viewpoints (different camera poses) using one or more image sensors. Feature points can be detected in the captured images of the scene using known image recognition techniques. For example, for an image comprising an object having several corner points, a corner detection algorithm such as FAST (Features from Accelerated Segment Test) can be used to extract feature points corresponding to the corners of one or more elements in the image, such as a corner of a chair or a corner of a wall. The feature points are thus identified in the plurality of captured images and are associated with one another in the sense that the image position of a particular three-dimensional point as captured in one image is associated with the image position of that three-dimensional point as captured in another image. The basis of a typical tracking and mapping system involves deriving, from this information on associated points in one image with points in another image, an internally consistent set of data defining the respective camera viewpoints and the three-dimensional positions of the points. In order for that set of data to be internally consistent, it should lead to a consistent set of three-dimensional positions, and in respect of a particular image, it should lead to a consistent relationship between the camera pose for that image and the expected (and actual) image positions of points as captured by that image.

Figure 2:
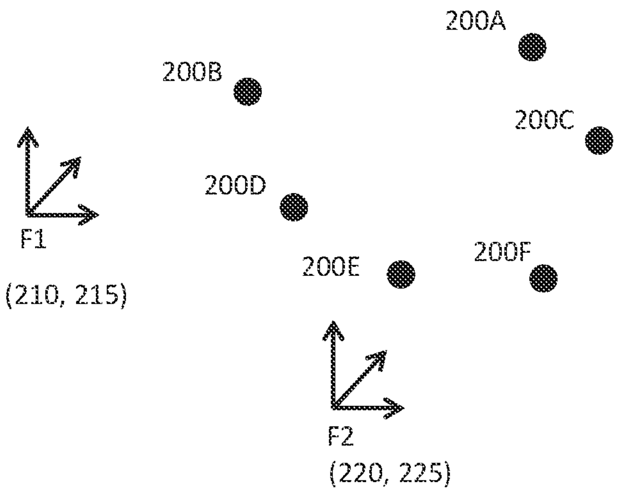
FIG. 2 schematically illustrates an example of a set of detected feature points for an environment.

To illustrate some of these concepts further, FIG. 2 schematically illustrates an example of a set of detected feature points (labelled as numerals 200A . . . 200F) obtained from two respective images captured with two different viewpoints F1, F2 for a scene. Each viewpoint comprises a camera position 210, 220 and a camera orientation 215, 225 relative to a local coordinate frame (illustrated schematically as three orthogonal axes in each case). Although, for practical reasons, FIG. 2 is drawn in two dimensions, the detected feature points each represent a three-dimensional point.

Figure 3A:
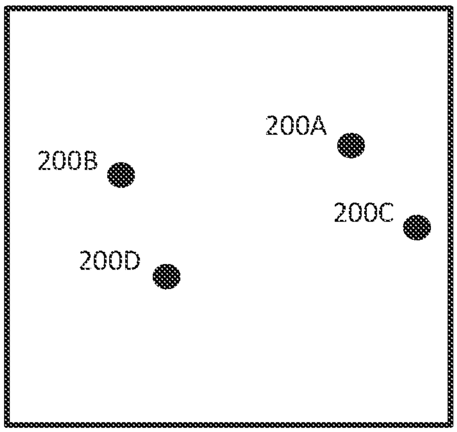
FIGS. 3A and 3B schematically illustrate images captured from the two viewpoints of FIG. 2.
Figure 3B:
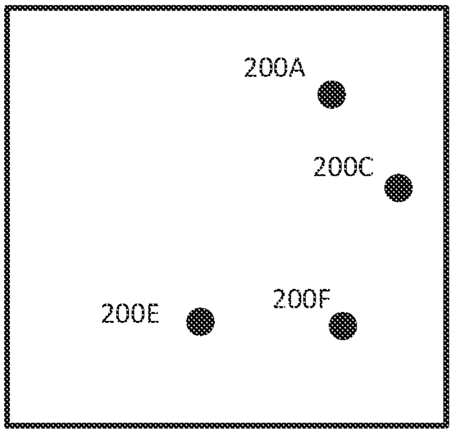

FIGS. 3*a* and 3*b* are schematic representations of images captured by the cameras at positions F1 and F2. In each case, some of the points 200A . . . 200F can be seen in the captured images. If the set of data discussed above is internally consistent, the actual image positions of these points will correspond to the image positions predicted from the camera pose and the three-dimensional positions derived for those points.

Figure 4:
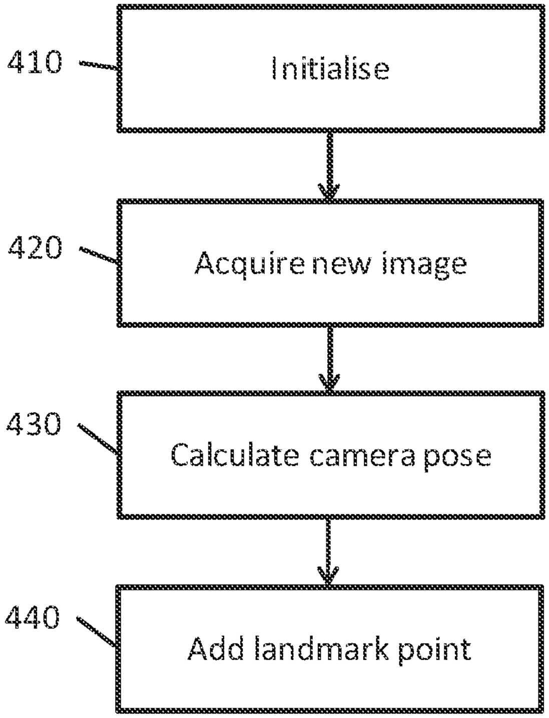
FIG. 4 is a schematic flowchart giving an overview of a tracking and mapping process.

FIG. 4 is a schematic flowchart giving an overview of a tracking and mapping process that can be performed on the basis of a set of detected feature points as shown in FIG. 2. The example process starts from no advanced (a priori) knowledge of either the camera viewpoints or the spatial position of feature points to be captured by the camera images. Accordingly, a first stage is to initialise the system at a step 410. Initialisation will be discussed in more detail below, but typically involves detecting feature points captured for different viewpoints so that a same feature point is detected for two or more different viewpoints, in which each detected feature point corresponds to a landmark point for use in mapping the scene, and deriving a set of map data for the scene using each of the landmark points.

A loop operation then follows, comprising the steps of acquiring a new image (for example, at an image capture rate such as 15 images per second, 30 images per second, 60 images per second or the like) at a step 420, calculating a position and orientation of the viewpoint for the new image from the set of map data and the newly acquired image at a step 430 and, potentially, adding detected feature points from the newly acquired image as further landmark points for updating the map at a step 440. Note that although the step 440 is shown in this example as forming part of the basic loop of operation, the decision as to whether to add further landmark points is optional and could be separate from this basic loop.

Figure 5:
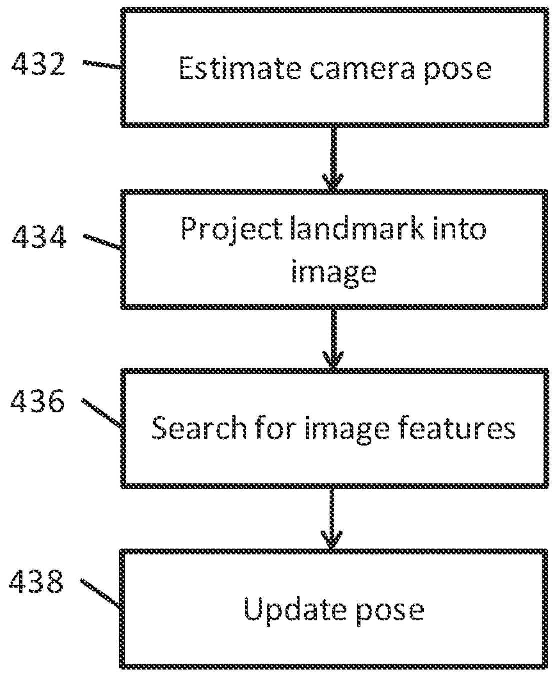
FIG. 5 is a schematic flowchart of a camera pose calculation process.

FIG. 5 is a schematic flowchart of operations carried out as part of the step 430 of FIG. 4. These operations are performed to derive a viewpoint position and orientation (also referred to as a camera pose) from a newly acquired image and the set of map data.

At a step 432, the system first estimates a prediction of a camera pose in respect of the newly acquired image. This initial estimation may be performed using a model. The model could be embodied as a position tracking filter such as a Kalman filter, so that a new camera pose is extrapolated from the recent history of changes in the camera pose. In another example, the model could make use of sensor data such as gyroscopic or accelerometer data indicating changes to the physical position and orientation in space of the device on which the camera is mounted (e.g. an HMD comprising one or more inertial sensors). However, at a very basic level, the new camera pose could be estimated simply to be the same as the camera pose derived in respect of a preceding captured image.

At a step 434, the landmark points of the map data are projected into corresponding positions in the newly acquired image based on the initial estimate of the camera pose. This gives an image position for a landmark point of the map in the newly captured image (or a subset of the landmark points under consideration), where the image position for the landmark point corresponds to where the landmark point is expected to be seen in the newly captured image. At a step 436, the system searches the newly captured image for image features corresponding to the landmark points. To do this, a search can be carried out for image features which relate to or correlate with the landmark point. The search can be carried out at the exact predicted position, but also at a range of positions near to the predicted position. Finally, at a step 438 the estimated camera pose for that image is updated according to the actual detected positions of the landmarks in the captured image.

Figure 6:
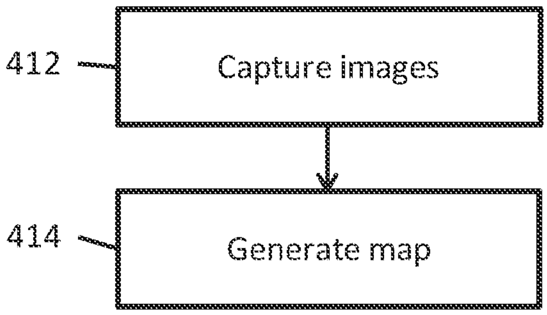
FIG. 6 is a schematic flowchart of an initialisation technique.

FIG. 6 is a schematic flowchart of a basic initialisation technique (corresponding to the step 450 discussed above), comprising, at a step 412, capturing a plurality of images of a scene from different viewpoints and, at a step 414, generating a map using each of the feature points detected from the captured images as a respective landmark point. The camera may be configured to capture images at a predetermined frame rate, or in some cases image capture may be instructed by a user providing a user input at a respective time to capture an image. As such, feature points for a plurality of different viewpoints can be detected and a map can be generated comprising a plurality of landmark points, in which each landmark point included in the generated map corresponds to a respective detected feature point, and in which each landmark point included in the map is associated with three-dimensional position information and image information for the detected feature point. Known Structure from Motion (SfM) techniques may be used for creating such a map data set. Optionally, the image capturing device may comprise one or more inertial sensors such as a gyroscope, magnetometer and/or accelerometer for tracking changes in positon and/or orientation and information from one or more such sensors can also be used for creating the map data set. The above description provides an overview of a typically technique for generating a map for an environment using detected feature points.

Figure 7:
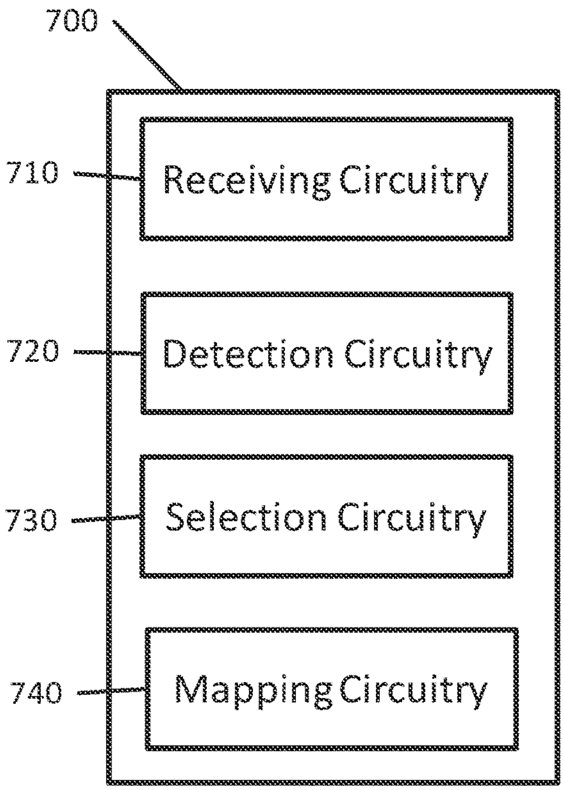
FIGS. 7 and 8 schematically illustrate respective data processing apparatuses.

FIG. 7 illustrates a data processing apparatus 700 in accordance with an embodiment of the disclosure. In embodiments of the disclosure, the data processing apparatus 700 comprises: receiving circuitry 710 to receive a plurality of images of an environment captured from respective different viewpoints; detection circuitry 720 to detect a plurality of feature points in the plurality of captured images and to associate image information with each detected feature point indicative of an image property for a detected feature point, wherein each detected feature point represents a candidate landmark point for mapping the environment; selection circuitry 730 to select one or more of the plurality of candidate landmark points, the one or more selected landmark points corresponding to a subset of the plurality of candidate landmark points; and mapping circuitry 740 to generate, for the environment, a map comprising one or more of the selected landmark points, wherein each landmark point included in the map is defined by a three dimensional position and the associated image information for that landmark point.

The receiving circuitry 710 is configured to receive a plurality of images captured for a given environment, in which the plurality of images include a plurality of respective different viewpoints for the environment. The plurality of images may be captured by a same image sensor (one image sensor) whilst the image sensor is moved with respect to the environment. Alternatively, the plurality of images may be captured by a plurality of image sensors each having respective different viewpoints for the environment. In some cases, the plurality of image sensors may be provided as part of a same mobile device, such as the HMD 20 or a robotic device, so that each of the plurality of image sensors captures a plurality of images of an environment from a plurality of respective viewpoints as the mobile device is moved with respect to the surrounding environment. Hence more generally, the receiving circuitry 710 receives the plurality of images captured by one or more image sensors providing a plurality of respective different viewpoints for the environment. The receiving circuitry 710 can receive the plurality of images via a wired or wireless communication (e. g. WiFi® or Bluetooth®). In some examples, the receiving circuitry 710 is provided as part of a processing device such as a games console (e.g. Sony® PlayStation5®) and receives the plurality of images from a handheld controller or an HMD via a wired or wireless communication.

Figure 8:
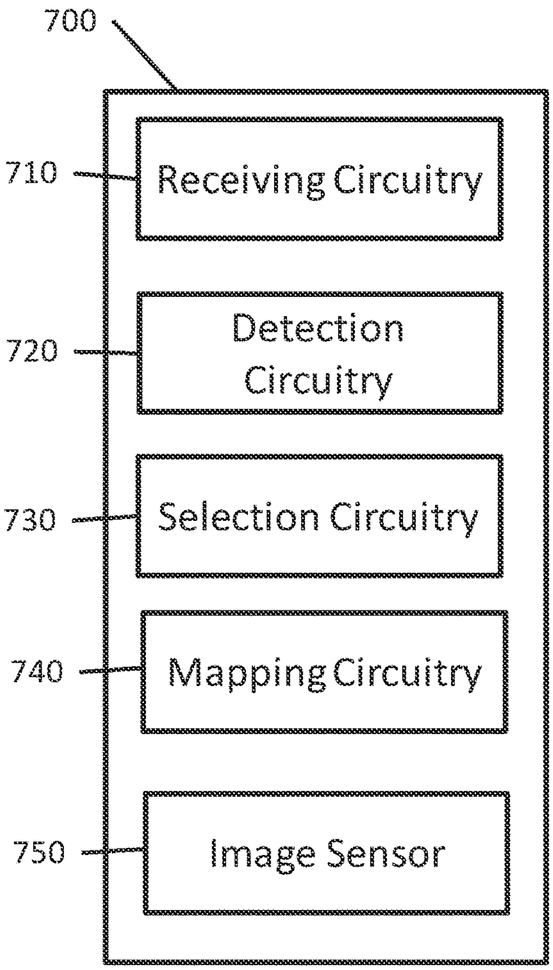

Referring now to FIG. 8, in embodiments of the disclosure the data processing apparatus 700 further comprises at least one image sensor 750 configured to capture a plurality of images of the environment from respective different viewpoints and the receiving circuitry 710 is configured to acquire the plurality of captured images for analysis by the detection circuitry 720. The data processing apparatus as shown in FIG. 8 may for example be a mobile apparatus such as an HMD apparatus 20 or a robotic device comprising one or more of the image sensors 750 each providing a different viewpoint. For example, in the case of an HMD, the plurality of images can be captured using one or more front-facing cameras mounted on the HMD 20 and processing for mapping the environment can be performed locally at the mobile apparatus.

Referring again to FIG. 7, the apparatus 700 comprises detection circuitry 720 to detect a plurality of feature points in the plurality of captured images obtained by the receiving circuitry 710. The detection circuitry 720 performs one or more image processing operations for at least some of a captured image of the environment to extract one or more feature points from the captured image. Salient features within the captured images including structures such as points, edges and corners can be detected and one or more feature points can thus be extracted for one or more image features in the image. For example, an edge of a wall can be detected in a captured image and one or more feature points can be associated with the edge. The detection circuitry 720 may use any suitable corner detection algorithm for detecting feature points in a captured image. Examples of suitable corner detection algorithms include FAST (Features from Accelerated Segment Test) and the Harris corner detection algorithm.

Alternatively or in addition, one or more predetermined markers (e.g. AR markers and/or QR codes and/or LEDs) may have been placed within the environment which can similarly be detected in a captured image by the detection circuitry 720. The detection circuitry 720 can thus be configured to detect a feature point corresponding to a predetermined marker in a given captured image. The use of predetermined markers is optional and is discussed in more detail later.

Hence, for a given image of the plurality of captured images received by the receiving circuitry 710, the detection circuitry 720 analyses at least some of the given image using one or more feature detection algorithms to detect one or more feature points in the captured image, in which a detected feature point corresponds to either a point for an object in the environment or a point for a predetermined marker in the environment.

The detection circuitry 720 thus detects feature points in the environment on the basis of the plurality of captured images, and generates a data set (also referred to herein as a candidate data set) comprising a plurality of detected feature points for the environment, in which each detected feature point is associated with image information indicative of an image property for the detected feature point. The image property associated with a detected feature point (candidate landmark point) can be compared with an image property in another image (such as a newly captured image that is captured once the map of the environment has been generated) so as to detect when the detected feature point is included in another image captured from another viewpoint. In some examples, the image information may comprise an image patch extracted from a captured image such that the image patch comprises a small area of image data (small relative to the size of the whole image) which can be used as a reference for detecting when the detected feature point is included in another image (e.g. small area of pixel data). The image information is thus indicative of an image property for the detected feature point so that information regarding a visual appearance as viewed in the captured image can be used for reference when later identifying a subsequent detection of that same feature point in another image.

The plurality of detected feature points for the environment thus represent a plurality of candidate feature points that can potentially each be used as landmark points for the environment for the purpose of mapping the environment. Hence, each detected feature point represents a candidate landmark point for mapping the environment, and the techniques to be discussed below relate to using the set of candidate landmark points output by the detection circuitry 720 so as to select a subset of the candidate landmark points for use in generating a map for the environment so that a more reliable map is generated for the environment using a selection of the candidate landmark points and processing efficiency for generating a map for the environment is improved.

Using the set of feature points detected by the detection circuitry 720, in which each feature point represents a candidate landmark point for mapping the environment, the selection circuitry 730 is configured to select one or more of the candidate landmark points so that the selected landmark points correspond to a subset (a portion) of the total candidate landmark points available for the environment. For example, using the captured images received by the receiving circuitry 710, the detection circuitry 720 may output a candidate data set comprising N respective candidate landmark points each having associated image information indicative of at least one image property for the candidate landmark point, and the selection circuitry 730 is configured to select M of the candidate landmark points so that just (or some of) the M selected landmark points are used for generating the map for the environment, where N an M are integers and N is greater than M.

The selection circuitry 720 is configured to perform a selection from the plurality of candidate landmark points in dependence upon at least one of the image information associated with the plurality of candidate landmark points and a user input with respect to the plurality of candidate landmark points to thereby select a subset of the plurality of candidate landmarks for use in generating a map. Techniques for selecting a subset of the candidate landmark points will be discussed in more detail below and some embodiments include the use of machine learning for this selection.

In some embodiments of the disclosure, the data processing apparatus 700 comprises a user input unit (not shown in FIG. 7 or 8) for receiving one or more user inputs. Techniques in which the selection circuitry 730 and/or the detection circuitry 720 perform one or more processing operations responsive to a user input received by the user input unit are discussed in more detail later. One or more user inputs can be provided to specify one or more areas of one or more of the captured images of the environment for which processing for extracting feature points is not to be performed, and/or one or more user inputs can be provided to specify one or more of the candidate landmark points (which have been detected) so as to specify one or more candidate landmark points which are to be prevented from being selected by the selection circuitry 730. In some examples, alternatively or in addition to a user input specifying an area of a given captured image that is to be excluded from processing for detecting feature points representing candidate landmark points, computer vision techniques can be applied to a given captured image to detect one or more areas of the given captured image to be excluded from processing for detecting feature points representing candidate landmark points. This is discussed in more detail later.

The mapping circuitry 740 is configured to generate a map for the environment, in which the map comprises one or more of the landmark points selected by the selection circuitry 730, wherein each landmark point included in the map is defined by a three dimensional position and the associated image information for that landmark point (i.e. a the map is generated to include a selected landmark point, and the selected landmark point is defined by a 3D position information as well as the image information obtained by the detection circuitry 720 for that landmark point when obtaining the plurality of candidate landmark points for the captured images). In this way, a map comprising a set of landmark points each defined by a three dimensional spatial position and image information associated with that three dimensional position is generated, and the map is reliably generated using the subset of landmark points that have been selected by the selection circuitry 720. A subsequently captured image of the environment including one or more of the landmark points provided in the map and viewed from an initially unknown viewpoint can thus be used together with the map to calculate a position and orientation of the viewpoint associated with the subsequently captured image to thereby track an image capturing device in the environment.

The generated map includes a plurality of landmarks that have been selected by the selection circuitry 730. Each of the landmarks is defined by a three dimensional (3D) position in space and image information (such as an extracted image patch) indicating one or more visual properties of that landmark, for example as viewed in a captured image from which that landmark was identified. The mapping circuitry 740 is thus configured to generate the map and to either store the map for use in tracking one or more image sensors in the environment or output the map for use by another device. For example, the map may be generated by a device that receives the plurality of images and once generated the map can be communicated to a portable device located in the environment. In this way, processing for generating the map can be performed by a device such as a remote server or a games console, and the map can then be output to a portable device, such as an HMD or robotic device, for performing processing for tracking locally at the portable device using the generated map.

In embodiments of the disclosure, the mapping circuitry 740 is configured to obtain another image of the environment captured from another viewpoint and to calculate a position and orientation of the another viewpoint with respect to the environment in dependence upon the map for the environment and one or more of the landmark points included in the another image. The map comprising the set of landmark points each defined by a three dimensional spatial position and image information associated with that three dimensional position can be evaluated with respect to a captured image for allowing a position and orientation of a viewpoint to be calculated for the captured image. The mapping circuitry 740 firstly estimates a position and orientation of the viewpoint in respect of the newly acquired image. The mapping circuitry 740 can obtain an estimate for the position and orientation of the viewpoint in a number of ways. In some examples, a positon and orientation of the viewpoint may be estimated by extrapolating from the recent history of changes in the camera pose calculated by the mapping circuitry 740. For example, the mapping circuitry 740 may receive a sequence of successive images captured by an image sensor and calculate a viewpoint for each image in the sequence, and a viewpoint for a next image in the sequence may be initially estimated by extrapolating the previously calculated viewpoints for some of the previous images in the sequence. In some examples, the viewpoint for the newly captured image can be estimated simply to be the same as the viewpoint derived in respect of the preceding captured image in the sequence of images. In other examples in which the image capturing device comprises one or more inertial sensors, sensor data can be used by the mapping circuitry 740 for estimating a viewpoint for the newly captured image.

Based on the initial estimate of the position and orientation for the viewpoint, the mapping circuitry 740 projects one or more of the landmarks included in the map of the environment into corresponding positions in the another image in dependence upon the 3D position information for one or more landmark points of the map, so as to obtain an image position for at least one landmark in the another image. This gives at least one image position for at least one landmark (or a subset of landmarks under consideration) of where the landmark is expected to be present in the another image. The mapping circuitry 740 then searches that image position (and optionally a small surrounding area when required) to detect whether there is a match for the image information corresponding to the projected landmark. Finally, the mapping circuitry 740 calculates the position and orientation for the viewpoint of the another image in dependence upon the detected position of the at least one landmark in the another image.

As explained above, embodiments of the disclosure optionally include the use of machine learning for selecting the landmark points to be used in the processing for generating the map of the environment. In other embodiments, computer vision techniques that do not employ the use of machine learning may be used for selecting the landmark points.

In embodiments of the disclosure, the image information is indicative of a size of an object detected in a captured image, and the selection circuitry 730 is configured to select a candidate landmark point in dependence upon the size of the object indicated by the image information for that candidate landmark point. The detection circuitry 720 can be configured to detect one or more objects included in a given captured image. One or more blob detection algorithms and/or one or more a corner detection algorithms may be used for detecting an object in an image. Image properties such as colour and brightness can be used to define boundaries for respective regions in the captured image so as to detect a plurality of respective objects. Alternatively, or in addition, machine learning image recognition techniques may be used to detect one or more objects in an image.

Hence, as well as detecting one or more feature points, one or more objects can be detected in an image. The detection circuitry 720 can thus detect a feature point and associate image information with a detected feature point indicative of a size of an object associated with the detected feature point. For example, in the case of a table in an image, the detection circuitry 720 may detect four feature points corresponding to the four corners of the table and also detect the region corresponding to the table based on colour segmentation. The detection circuitry 720 can thus associate image information with each of the four feature points to indicate a size of the object associated with these feature points. The size for an object may be indicated in units of distance, such as a distance associated with a longest axis for the object or indicated in units of area (e.g. $cm^2$) according to an area occupied by the object in the image.

Therefore, the detection circuitry 720 can be configured to output the candidate data set, in which this candidate data set comprises a plurality of candidate landmark points (each corresponding to a respective detected feature point) each having associated image information indicative of a size of an object corresponding to that candidate landmark point. Based on the image information, the selection circuitry 720 can select a subset of the plurality of candidate landmark points so that candidate landmark points selected for inclusion in the map are selectively chosen according to object size. In some examples, the selection circuitry 720 is configured to select a candidate landmark point in dependence upon whether the size of the object indicated by the image information for that candidate landmark point is greater than a threshold size so that only a landmark point corresponding to an object having at least a threshold size is selected for use in the processing for generating the map.

A size of an object is often correlated with the object's mobility in that the larger an object is the more likely it is that the object is fixed in place or will at least remain stationary over a period of time, whereas the smaller an object is the easier it is for that object to be moved and thus the more likely it is to be moved. As such, an object's likelihood of remaining stationary can be inferred based on a size of the object. By selecting candidate landmark points based on object size, the landmark points corresponding to large objects can be selected for inclusion in the map whilst landmark points corresponding to small objects can be inhibited from being selected. In this way, landmark points corresponding to large objects and thus having a higher likelihood of corresponding to an object that will remain stationary can be used for generating the map, and landmark points having a higher likelihood of moving can be restricted from being used in the map. In contrast to this, existing SLAM-based techniques typically generate a map that can include non-stationary landmarks which can result in failure of tracking in the case where the 3D position of the landmark changes during use.

In embodiments of the disclosure, the selection circuitry 720 is configured to select a candidate landmark point in dependence upon first classification data associated with the candidate landmark point, wherein the first classification data is output by a machine learning model trained to classify objects based on object mobility. The first classification data associated with a candidate landmark point is indicative of a mobility classification for the candidate landmark point from a plurality of mobility classifications such that the first classification data provides an indication of a level of mobility for the landmark point as predicted by the machine learning model. The machine learning model is trained to classify respective objects according to their degree of mobility and to output first classification data indicative of a mobility classification for a given object. The machine learning model may be trained using labelled training data comprising image frames for which certain types of object are labelled as mobile and other types of object are labelled as static. For example, objects such as humans, household pets, books, drinking vessels, doors, chairs and stationery equipment can be given a first label whereas objects such as tables, walls, book cases, wall mounted frames, wall mounted speakers and lamps can be given a second label.

The machine learning model can thus be trained to learn a mobility classification for respective types of objects so as to classify a given type of object as either mobile or static according to a binary classification using such labelled training data. Similarly, the labelled training data may instead comprise a plurality of labels in which a first label is used for objects that have a high degree of mobility, such as humans and pets, and a second label is used for intermediate objects that have an intermediate degree of mobility, such as drinking vessels and chairs, and a third label is used for objects that have a low degree of mobility, such as walls and book cases. The machine learning model can thus be trained to learn to classify objects using a multi-class classification. It will be appreciated that whilst the above example has been described using three respective label types, two or more respective label types can be used according to how many classifications are desired. Hence more generally, the machine learning model can be trained to learn to classify different types of object included in one or more images based on object mobility and to output first classification data for one or more objects included in an image provided as an input to the machine learning model.

Alternatively, another technique for training the machine learning model may use training data comprising sets of images captured for a plurality of different indoor environments. The machine learning model can be trained using a first set of images for a respective environment to learn one or more types of object that change position and/or orientation within the first set of images and one or more types of object for which there is no change in position and orientation. For example, for a set of images captured for a given environment over a time period of X minutes, objects such as humans, pets, chairs and drinking vessels can be identified as moving during this time period, whereas objects such as tables, walls and bookcases can be identified as remaining static throughout. Consequently, using sets of images captured for different indoor environments, the machine learning model can be trained to learn one or more types of object with a high degree of mobility and one or more types of object with a low degree of mobility. For larger training data sets it will be appreciated that the training of the machine learning model can be enhanced to learn types of objects with different levels of relative mobility such that a multi-class classification of objects according to their different levels of mobility can be learnt.

Hence more generally, the machine learning model can be trained to receive an input comprising an image of an environment and to output the first classification data for one or more objects included in the image, in which the first classification data is indicative of a degree of mobility for the one or more objects. A detected feature point associated with an object in the image for which the first classification data has been output by the machine learning model can thus be associated with the first classification data. In the case where a plurality of feature points are detected by the detection circuitry 720 for a same object in an image (e.g. detecting four corner points for a table), then each of the feature points is associated with the first classification data output by the machine learning model for that object.

Consequently, the machine learning model can be trained to output the first classification data which can be associated by the detection circuitry 720 with each of the candidate landmark points identified by the detection circuitry 720, and the detection circuitry 720 can be configured to output the candidate data set for the plurality of images received by the receiving circuitry 710, in which the candidate data set comprises a plurality of candidate landmark points each having associated image information for visually identifying that landmark point and associated first classification data indicative of a level of mobility for the landmark point as predicted by the machine learning model. The candidate data set is thus received by the selection circuitry 730 so that a subset of the candidate landmark points can be selected based on the first classification data to thereby select landmark points having a classification indicative of a low degree of mobility whilst inhibiting selection of landmark points having a classification indicative of a high degree of mobility.

Therefore, the subset of landmark points selected for use in generating the map for the environment can be selected to preferentially include landmark points for which there is a low likelihood of movement so that the map can be generated with improved reliability. In addition, processing efficiency associated with generating a map including landmark points is improved by using a subset of landmark points rather than each of the candidate landmark points identified by the detection circuitry 720.

Moreover, SLAM techniques can be performed using the map and problems that can arise due to movement of a landmark point after the map has been generated, thereby resulting potential loss of tracking, can be overcome. Processing for tracking using SLAM can therefore be performed using landmark points with a higher reliability and with improved processing efficiency by allowing processing for SLAM to be performed using a selection of feature points available for an environment.

In embodiments of the disclosure, the first classification data associated with a candidate landmark point comprises a classification from a plurality of classifications corresponding to respective levels of object mobility. As explained above, the machine learning model can be trained to receive a captured image of an environment and output the first classification data in dependence upon one or more object types included in the captured image. The detection circuitry 720 can thus be configured to output the candidate data set for the plurality of images received by the receiving circuitry 710, in which the candidate data set comprises a plurality of candidate landmark points having associated first classification data. The plurality of candidate landmark points may thus include a first candidate landmark point for which the associated first classification data is indicative of a first mobility classification and a second candidate landmark point for which the associated first classification data is indicative of a second mobility classification, in which the first mobility classification has a different level of mobility to the second mobility classification. The number of mobility classifications is not particularly limited and in some cases the first classification data associated with a candidate landmark point may comprise a classification from two mobility classifications, three mobility classifications or four mobility classifications and so on, in which each mobility classification corresponds to a different level of mobility.

In embodiments of the disclosure, the first classification data associated with a candidate landmark point comprises a classification from a plurality of classifications, and the plurality of classifications comprises a first mobility classification and a second mobility classification, wherein the first mobility classification corresponds to a static classification and the second mobility classification corresponds to a mobile classification. The first classification data can be used to distinguish the respective candidate landmark points identified by the detection circuitry 720 according to a binary classification of "mobile" or "static". Therefore, with reference to the first classification data, the selection circuitry 730 can reliably select a subset of the candidate landmark points indicated as having a static classification. Therefore, in embodiments of the disclosure, the selection circuitry 730 is configured to select a candidate landmark point for which the associated first object classification data indicates that the candidate landmark point corresponds to an object having a static classification. Consequently, a subset of the candidate landmark points can be chosen by deliberately not selecting landmark points indicated as having a mobile classification.

In other embodiments of the disclosure, the plurality of classifications comprises more than two mobility classifications, such as a first, second and third mobility classification. In this case, the first mobility classification is indicative of a static classification, the second mobility classification is indicative of an intermediate (intermediate mobility) classification and the third mobility classification is indicative of a high mobility classification. For example, the intermediate classification may correspond to types of object which are capable of movement but for which movement is less likely (such as a drinking vessel or a chair), whereas the high mobility classification may correspond to types of object which are capable of movement and for which movement is more likely (such as humans or pets). It will be appreciated that a larger number of respective mobility classifications may similarly be provided to provide a more granular classification. The use of more than two mobility classifications may be beneficial in circumstances in which the environment observed in the plurality of captured images comprises a relatively small number of detected feature points and thus a relatively small number of candidate landmark points. In particular, for an environment comprising a small number of candidate landmark points, and thus potentially a small number of candidate landmark points having a static classification, the selection circuitry 720 can be configured to select a subset of the candidate landmark points for the environment by selecting each of the candidate landmark points associated with a static classification and at least some of the candidate landmark points associated with the intermediate classification, whilst not selecting any of the landmark points associated with the high mobility classification. Conversely, for an environment comprising a large number of candidate landmark points, then the selection circuitry 730 may instead select only from the candidate landmark points associated with a static classification.

In some examples, the selection circuitry 730 may be configured to select the subset of landmark points by selecting at least a threshold number of the plurality of candidate landmark points identified by the detection circuitry 720. Therefore, for an environment comprising a small number of candidate landmark points, and thus potentially a small number of candidate landmark points having a static classification, the selection circuitry 730 can firstly select each of the candidate landmark points having the static classification and then select from the candidate landmark points having the intermediate classification to thereby select at least the threshold number of landmark points. For example, the selection circuitry 730 may randomly select from the candidate landmark points having the intermediate classification to thereby select at least the threshold number of landmark points. Alternatively, rather than using three mobility classifications as described above, a larger number of mobility classifications may be used, and the selection circuitry 730 can be configured to select at least a threshold number of the plurality of candidate landmark points by firstly selecting candidate landmark points having the first classification, then selecting candidate landmark points having the second classification and so on until reaching a threshold number of landmark points. Hence more generally, in some examples the first classification data comprises a plurality of classifications corresponding to respective levels of object mobility, and the selection circuitry is configured to select a subset of the plurality of candidate landmark points in dependence upon an order of priority, in which candidate landmark points having a first mobility classification have a higher priority than candidate landmark points having a second mobility classification.

In embodiments of the disclosure, the selection circuitry 730 is configured to select a candidate landmark point in dependence upon the first classification data associated with the candidate landmark point, wherein the first classification data is output by the machine learning model trained to classify objects based on object mobility, wherein the selection circuitry 730 is configured to remove at least one landmark point from the selected landmark points in dependence upon a user input with respect to the selected landmark points, and the mapping circuitry 740 is configured to update the map for the environment. The subset of the candidate landmark points selected on the basis of the first classification data comprises landmark points associated with objects having either a static classification, or at least a low mobility classification, such that the map can be generated using landmark points with a high likelihood of remaining stationary during tracking. However, even some static features can still be problematic for SLAM based techniques. Features such as mirrors, glass panels (e.g. windows, doors) and display screens can have an appearance that varies depending upon a position and/or orientation from which the feature is observed due to reflections. This can be problematic in that using a feature point corresponding to such an object as a landmark point can mean that the image information associated with the landmark point may not be able to identify the landmark point when observed in a newly captured image taken from a different viewpoint due to the different appearance, thereby potentially resulting in disruption of tracking. Consequently, the selection circuitry 730 can be configured to remove at least one landmark point from the selected landmark points based on a user input with respect to the landmark points that have been selected by the selection circuitry 730. The user input can be received from a user input device such as a handheld controller for allowing the user to select one or more individual landmark points from the selected landmark points.

Selection of a landmark point to remove that landmark point from the landmark points can be achieved based on a user input either with respect to a list comprising the landmark points selected by the selection circuitry 730 or with respect to a graphical representation of the map generated by the mapping circuitry 740.

In some embodiments, the data processing apparatus 700 comprises processing circuitry to generate a graphical representation of the map generated by the mapping circuitry 740 for display. The processing circuitry can thus output image data indicative of a graphical representation of at least a part of the generated map for display to a user via a display unit. For example, in the case of a user wearing an HMD, the output circuitry is configured to output the generated image data to the HMD for display to the user wearing the HMD. Similarly, in the case where the receiving circuitry 710 receives images captured by one or more image sensors mounted on another portable entertainment device such as the Sony® PlayStation Vita® (PSV), the processing circuitry can output the generated image data for display by a display device such as a monitor or a television. Hence more generally, a graphical representation of at least part of the map generated by the mapping circuitry 740 can be output for display to a user, such that the graphical representation includes a visual representation of at least some of the landmark points relative to the environment, and a user input corresponding to a selection of a landmark point included in the map can be received for removing that landmark point. The mapping circuitry 740 thus updates the map to remove at least one landmark point selected for removal by a user. In this way, a user can manually select landmark points corresponding to problematic objects such as mirrors, glass panels and display screens to thereby remove these features from the map and the map can be updated accordingly by the mapping circuitry 740.

In embodiments of the disclosure, the detection circuitry 720 is configured to detect one or more predetermined markers in the plurality of captured images as one or more of the detected feature points such that a detected predetermined marker corresponds to a respective candidate landmark point. One or more predetermined markers can be placed in an environment for use in generating a mapping for the environment. For example, for particularly problematic environments comprising a relatively small number of features, the use of such predetermined markers can assist in providing a number of reliable points for mapping. The one or more optically detectable predetermined markers comprise at least one of a passive marker and an active marker, in which passive markers reflect incident light and active markers comprise one or more LEDs for emitting light. Examples of passive optically detectable markers which can be provided include: one or more shapes having a predetermined colour and/or one or more optically reflective markers configured to reflect light. An optically reflective marker that reflects at least one of visible light and infra-red light may be used. The detection circuitry 720 can thus be configured to detect a feature point corresponding to a predetermined marker in a given captured image.

In embodiments of the disclosure, the detection circuitry 720 is configured to associate second classification data with a candidate landmark point in dependence upon whether the candidate landmark point corresponds to a predetermined marker, and wherein the selection circuitry 720 is configured to select the candidate landmark point in dependence upon whether the second object classification data is associated with the candidate landmark point. The detection circuitry 720 can detect a predetermined marker included in a captured image, for example by detecting an image feature in a captured image that matches a reference image feature stored for a predetermined marker. In response to detecting a feature point corresponding to a predetermined marker, the detection circuitry 720 associates second classification data with the detected feature point to thereby obtain at least one candidate landmark point having associated second classification data. The selection circuitry 720 can thus select from the plurality of candidate landmark points to select candidate landmark points associated with the second classification data to thereby select landmarks corresponding to predetermined markers for generating the map. In this way, candidate landmark points corresponding to predetermined markers can be preferentially selected for generating the map for the environment. Therefore, the detection circuitry 720 can be configured to output the candidate data set for the plurality of images received by the receiving circuitry 710 in which the candidate data set comprises one or more candidate landmark points having associated image information indicative of an image property and associated second classification data, and the selection circuitry 730 can perform a selection from the candidate data set responsive to whether second classification data is associated with a candidate landmark point.

Figure 9:
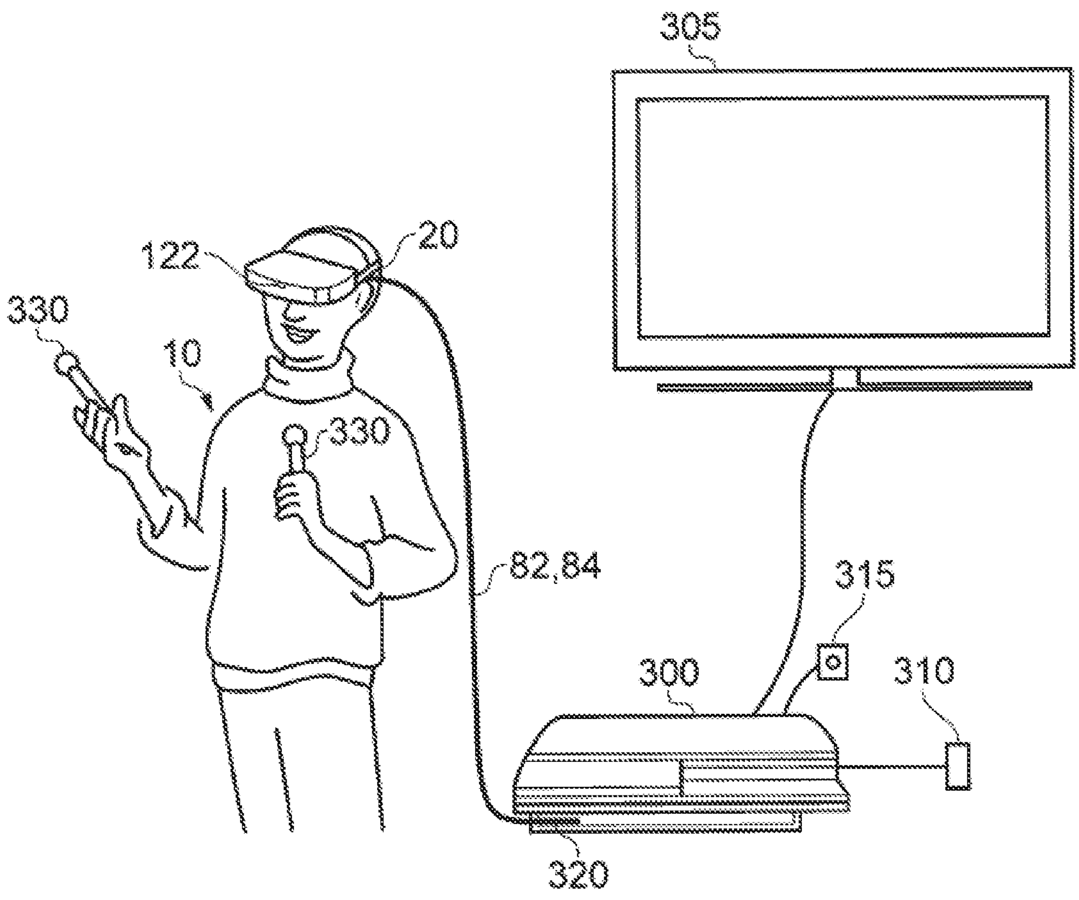
FIG. 9 schematically illustrates a user wearing an HMD connected to a games console.

FIG. 9 schematically illustrates an example virtual reality system and in particular shows a user wearing the HMD 20 connected to a games console 300. The games console 300 is connected to a mains power supply 310 and to a display device 305. One or more cables 82, 84 may optionally link the HMD 20 to the games console 300 or the HMD 20 may communicate with the games console via a wireless communication.

The video displays in the HMD 20 are arranged to display images generated by the games console 300, and the earpieces 60 in the HMD 20 are arranged to reproduce audio signals generated by the games console 300. Note that if a USB type cable is used, these signals will be in digital form when they reach the HMD 20, such that the HMD 20 comprises a digital to analogue converter (DAC) to convert at least the audio signals back into an analogue form for reproduction.

Images from an image sensor 122 mounted on the HMD 20 can optionally be passed back to the games console 300 via one or more of the cables 82, 84. Similarly, if motion or other sensors are provided at the HMD 20, signals from those sensors may be at least partially processed at the HMD 20 and/or may be at least partially processed at the games console 300. The use and processing of such signals will be described further below.

The USB connection from the games console 300 may also provide power to the HMD 20, according to the USB standard.

FIG. 9 also shows the separate display device 305 such as a television or other openly viewable display (by which it is meant that viewers other than the HMD wearer may see images displayed by the display 305) and an image sensor 315, which may be (for example) directed towards the user (such as the HMD wearer) during operation of the apparatus. An example of a suitable image sensor is the PlayStation® Eye camera, although more generally a generic "webcam", connected to the console 300 by a wired (such as a USB) or wireless (such as Wi-Fi® or Bluetooth®) connection.

The display 305 may be arranged (under the control of the games console) to provide the function of a so-called "social screen". It is noted that playing a computer game using an HMD can be very engaging for the wearer of the HMD but less so for other people in the vicinity (particularly if they are not themselves also wearing HMDs). To provide an improved experience for a group of users, where the number of HMDs in operation is fewer than the number of users, images can be displayed on a social screen. The images displayed on the social screen may be substantially similar to those displayed to the user wearing the HMD, so that viewers of the social screen see a virtual environment (or a subset, version or representation of it) as seen by the HMD wearer. In other examples, the social screen could display other material such as information relating to the HMD wearer's current progress through an ongoing computer game. For example, the HMD wearer could see a virtual environment from a first person viewpoint whereas the social screen could provide a third person view of activities and movement of the HMD wearer's avatar, or an overview of a larger portion of the virtual environment. In these examples, an image generator (for example, a part of the functionality of the games console) is configured to generate some of the virtual environment images for display by a display separate to the head mountable display.

In FIG. 9 the user is also shown holding a pair of hand-held controllers 330 which may be, for example, Sony® Move® controllers which communicate wirelessly with the games console 300 to control (or to contribute to the control of) game operations relating to a currently executed game program.

In embodiments of the disclosure, the detection circuitry 720 is configured to detect a plurality of the predetermined markers, wherein the plurality of predetermined markers is arranged on at least one of a frame of a display device in the environment and in an image displayed by the display device. Predetermined markers can generally be arranged at various locations within an environment to assist in providing feature points for the environment that can be used for mapping. A display device, such as the display device 305 in FIG. 9, is a common feature for a system in which a user wears an HMD to play a video game. For an arrangement such as that shown in FIG. 9, one or more image sensors provided as part of the HMD 20 can capture a plurality of images of the user's environment in which at least some of the images include at least a portion of the display device 305. The display device thus represents an object which can potentially provide one or more feature points in the environment for mapping and tracking. However, such a display device can often present difficulties when detecting feature points as the display device can have varying appearances due to the different images displayed at different times and potentially reflective portions of the frame. In embodiments of the disclosure, the detection circuitry 720 is configured to detect a set of predetermined markers arranged on a frame of a display device and/or in an image displayed by the display device. In this way, feature points corresponding to the display device can be detected and used as candidate landmark points, and the use of the predetermined markers can ensure that the visual appearance remains unchanged thus providing reliable points for mapping at locations on the frame of the display device and/or within the display area of the display device. Hence more generally, the detection circuitry 720 is configured to detect a plurality of predetermined markers comprising one or more physical markers arranged on a display device and/or one or more on-screen markers (displayed markers) displayed on the display device.

In some examples, the display device can be controlled to display an image frame comprising a border region, in which the border region comprises a plurality of on-screen markers for detection by the detecting circuitry 720 as respective feature points. Alternatively or in addition, one or more on-screen markers may be provided within a region of the display image comprising a content. For example, one or more on-screen markers may be incorporated into the displayed content for a video game so as to have a fixed position on the screen of the display device.

In embodiments of the disclosure, the selection circuitry 720 is configured to select one or more of the landmark points from the plurality of candidate landmark points in dependence upon a user input with respect to either one or more of the plurality of captured images or the plurality of candidate landmark points to thereby select the subset of the plurality of candidate landmark points. Prior to generating the map using the landmark points selected by the selection circuitry 730, the user can provide one or more user inputs with respect to either one or more of the plurality of captured images for the environment or the candidate landmark points identified by the detection circuitry 720. The user input can specify one or more of the candidate landmark points so that the selection circuitry 730 selects the one or more candidate landmark points specified by the user input. Alternatively or in addition, the user input can specify one or more of the candidate landmark points so that the selection circuitry 730 is prevented from selecting the one or more candidate landmark points specified by the user input. Alternatively or in addition, the user can provide one or more user inputs with respect to one or more of the plurality of captured images received by the receiving circuitry 710 to specify one or more areas of at least one of the images so that the selection circuitry 730 is prevented from selecting a candidate landmark point included in a specified area of a captured image. Alternatively or in addition, the user can provide one or more user inputs with respect to one or more of the plurality of captured images received by the receiving circuitry 710 to specify one or more areas of at least one of the images so that the selection circuitry is configured to select a candidate landmark point conditional on the landmark point being included in a specified area.

This can be achieved for example by the processing circuitry (as already described above) generating for display one or more of the captured images received by the receiving circuitry 710 so that a user can provide an input to specify an area in at least one of the captured images. Any suitable technique may be used to allow the provision of a user input specify an area in an image, such as the use of a touch screen or a mouse pointer. Alternatively or in addition, the processing circuitry may generate for display one or more of the captured images received by the receiving circuitry 710 with one or more detected feature points (one or more candidate landmark points) superimposed on the captured image so that the user can provide an input to specify either an area or an individual candidate landmark point. The processing circuitry can thus output image data indicative of one or more of the captured images with one or more superimposed candidate landmark points. A device such as an HMD or a display device (e.g. display device 305) can thus output an image for display to a user in dependence upon the image data to visually indicate to the user a relationship of one or more candidate landmark points with respect to the images of the environment. Using a user input device the user can provide one or more user inputs with respect to the plurality of candidate landmark points to thereby specify for a given candidate landmark point that the given landmark point is to be selected by the selection circuitry 730 or that the given landmark point is to be prevented from being selected by the selection circuitry 730, or to specify a region as mentioned above so that one or more landmarks within the region can be specified by the user.

Hence in embodiments of the disclosure, the user input specifies one or more of the plurality of candidate landmark points to prevent selection of the one or more specified candidate landmark point by the selection circuitry 730. Upon viewing the one or more images with the candidate landmark points displayed as an overlay, the user can make an informed decision as to whether to select a given candidate landmark point that is to be prevented from being selected by the selection circuitry 730. For example, the one or more images may include an image in which one or more candidate landmark points correspond to a door in the image or a mirror in the image. Given that there is a possibility of the door subsequently being moved, the user can provide a user input to specify one or more points corresponding to the door as points that the selection circuitry 730 is to be prevented from selecting. Similarly, given that the mirror is likely to have a varying appearance depending upon a position and orientation from which the mirror is viewed, the user can provide a user input to specify one or more points corresponding to the mirror as points that the selection circuitry 730 is to be prevented from selecting.

Consequently, in embodiments of the disclosure a user can specify one or more candidate landmark points, each representing a candidate that can potentially be used for mapping the environment, in order to inhibit selection of the one or more specified candidate landmark points by the selection circuitry 730. As explained above, rather than providing a user input to specify a respective candidate landmark point to inhibit selection of that respective candidate landmark point by the selection circuitry 730, the user can provide the user input with respect to the plurality of candidate landmark points by specifying an area in one of the captured images to prevent selection by the selection circuitry 730 of any candidate landmark point included in the specified area. For example, the processing circuitry can output image data indicative of one or more of the images received by the receiving circuitry 710 (which may optionally be overlaid with one or more candidate landmark points identified by the detection circuitry 720) so that a user input can be provided to specify an area in the image such that any candidate landmark points corresponding to the specified area are prevented from being selected by the selection circuitry 730 for generating the map. Consequently, one or more areas of the environment, which may include features that can be problematic either because of movement or due to variable appearances, can be designated by the user as being areas within which selection by the selection circuitry 730 is to be prevented. It will be appreciated that the user input can specify one or more candidate landmark points to be prevented from being selected by the selection circuitry 730, and that the other candidate landmark points not specified by the user can be used in any of the techniques described previously so that the selection circuitry 730 selects from the remaining candidate landmark points, for example in dependence upon at least one of the first classification data, second classification data and the image information indicative of object size.

In embodiments of the disclosure, the detection circuitry 720 is configured to detect the plurality of feature points in the plurality of captured images in dependence upon a user input with respect to one or more of the plurality of captured images specifying one or more image regions to be excluded from analysis by the detection circuitry 720. Prior to the analysis by the detection circuitry 720 for the plurality of images received by the receiving circuitry 710, a user can provide one or more user inputs with respect to one or more of the images to specify one or more areas in one or more of the images within which processing for detecting a feature point is not to be performed. This can be achieved by displaying one or more of the images to a user (e.g. by the processing circuitry outputting image data for display via an HMD, in a manner similar to that described above) and receiving a user input specifying one or more areas to be excluded from processing for detecting feature points by the detection circuitry 720. The user can provide a user input to specify one or more areas of at least one of the images so that one or more areas specified by the user are subjected to processing by the detection circuitry 720 to detect the feature points and areas not specified by the user are excluded from processing by the detection circuitry 720 for detecting feature points. Alternatively or in addition, the user can provide a user input to specify one or more areas that are to be excluded from processing by the detection circuitry 720 for detecting feature points.

For example, a user may provide a user input using a handheld controller or other similar input device to indicate a region of an image including a door or a mirror, for example, so that the indicated region can be excluded from analysis by the detection circuitry 720 thereby allowing more efficient use of processing resources by excluding regions which may be problematic for detecting feature points and/or excluding large regions in which detection of a reliable feature point is unlikely.

Moreover, one or more areas of one or more of the captured images that may be problematic, because the area is not well suited to feature point detection (e.g. due to reflections causing a changeable appearance and/or because the area includes features having a high degree of mobility), can be indicated for exclusion from processing by the detection circuitry 720. In some examples, alternatively or in addition to a user input specifying an area of a given captured image that is to be excluded from processing for detecting feature points, computer vision techniques can be applied to a given captured image to detect one or more areas of the given captured image to be excluded from processing for detecting feature points representing candidate landmark points. A computer vision algorithm may be used to detect an area of an image including objects typically associated with higher degrees of mobility and generate an output indicative of an area of the captured image which is to be excluded from processing by the detection circuitry 720 for detecting feature points. For example, a computer vision algorithm that detects objects in an image can provide an output (detection result) indicating an area of an image including an object such as a person or a pet, and the detection circuitry 720 can be configured to detect feature points in the image in dependence upon the output of the computer vision algorithm to exclude one or more areas of the image from processing for feature point detection. Hence more generally, the detection circuitry 720 can be configured to detect the plurality of feature points in the plurality of captured images in dependence upon at least one of a user input and a detection result of a computer vision algorithm with respect to one or more of the plurality of captured images, in which the user input and/or the detection result specifies one or more image regions to be excluded from analysis by the detection circuitry 720.

Figure 10:
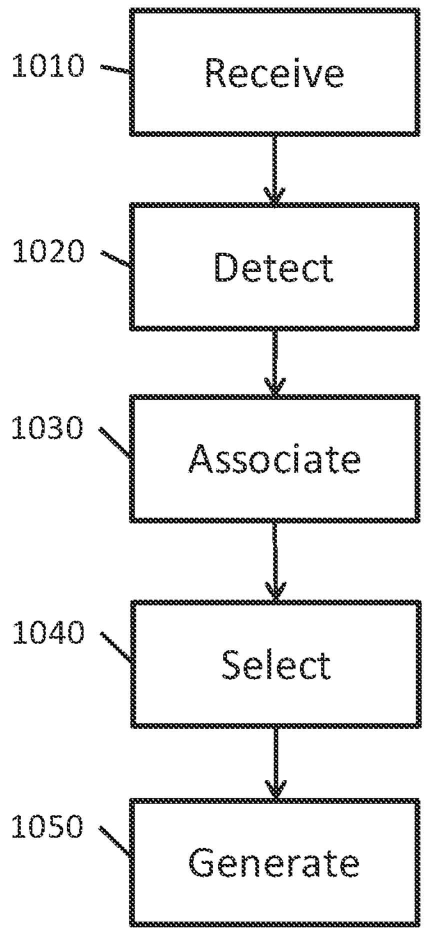
FIG. 10 is a schematic flowchart of a data processing method.

FIG. 10 is a schematic flowchart illustrating a data processing method. The method comprising:

- receiving (at a step 1010) a plurality of images of an environment captured from respective different viewpoints;
- detecting (at a step 1020) a plurality of features points in the plurality of captured images;
- associating (at a step 1030) image information with each detected feature point indicative of an image property for a detected feature point, each detected feature point representing a candidate landmark point for mapping the environment;
- selecting (at a step 1040) one or more of the plurality of candidate landmark points, the one or more selected landmark points corresponding to a subset of the plurality of candidate landmark points; and
- generating (at a step 1050), for the environment, a map comprising one or more of the selected landmark points, wherein each landmark point included in the map is defined by a three dimensional position and the associated image information for that landmark point It will be appreciated that example embodiments can be implemented by computer software operating on a general purpose computing system such as a games machine. In these examples, computer software, which when executed by a computer, causes the computer to carry out any of the methods discussed above is considered as an embodiment of the present disclosure. Similarly, embodiments of the disclosure are provided by a non-transitory, machine-readable storage medium which stores such computer software.

It will also be apparent that numerous modifications and variations of the present disclosure are possible in light of the above teachings. It is therefore to be understood that within the scope of the appended claims, the disclosure may be practised otherwise than as specifically described herein.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A data processing apparatus, comprising:
receiving circuitry to receive a plurality of images of an environment captured from respective different viewpoints;
detection circuitry to
receive a user input specifying one or more regions in at least one of the plurality of images to be excluded from analysis,
exclude the one or more regions from the at least one of the plurality of images,
after the exclusion, detect a plurality of feature points in each one of the plurality of captured images, wherein at least one feature point is detected in a region of the at least one image that has not been excluded, and
associate image information with each one of the plurality of feature points being indicative of an image property for the one of the plurality of feature points so detected within the one of the plurality of captured images after exclusion, wherein each detected feature point represents a candidate landmark point for mapping the environment;
selection circuitry to select a subset of the plurality of candidate landmark points, the subset of the plurality of candidate landmark points to be used as a plurality of landmark points for use in generating a map; and
mapping circuitry to generate, for the environment, the map comprising the plurality of landmark points, wherein each one of the plurality of landmark points is defined by a three dimensional position and the associated image information for that one of the plurality of landmark points.

2. The data processing apparatus according to claim 1, wherein the selection circuitry selects the subset of the plurality of candidate landmark points in dependence upon first classification data associated with each one of the plurality of candidate landmark points, wherein the first classification data is output by a machine learning model trained to classify objects based on object mobility.

3. The data processing apparatus according to claim 2, wherein the first classification data associated with each one of the plurality of candidate landmark points comprises a classification from a plurality of classifications corresponding to respective levels of object mobility.

4. The data processing apparatus according to claim 3, wherein the plurality of classifications comprises a first mobility classification and a second mobility classification, wherein the first mobility classification corresponds to a static classification and the second mobility classification corresponds to a mobile classification.

5. The data processing apparatus according to claim 2, wherein the selection circuitry selects the one of the plurality of candidate landmark points for which the associated first classification data indicates that the one of the plurality of candidate landmark points corresponds to an object having a static classification.

6. The data processing apparatus according to claim 2, wherein
the user input further includes instructions with respect to the plurality of landmark points,
the selection circuitry removes at least one landmark point from the plurality of landmark points in dependence upon the user input with respect to the plurality of landmark points, and
the mapping circuitry updates the map for the environment.

7. The data processing apparatus according to claim 1, wherein the detection circuitry detects a predetermined marker in the plurality of captured images as one or more of the plurality of feature points so detected such that each predetermined marker corresponds to one of the plurality of candidate landmark points.

8. The data processing apparatus according to claim 7, wherein the detection circuitry associates second classification data with the one of the plurality of candidate landmark points in dependence upon whether the one of the plurality of candidate landmark points corresponds to predetermined marker, and wherein the selection circuitry selects the candidate landmark point in dependence upon whether the second classification data is associated with the one of the plurality of candidate landmark points.

9. The data processing apparatus according to claim 7, wherein the detection circuitry further detects a plurality of the predetermined markers, wherein the plurality of predetermined markers is arranged on at least one of a frame of a display device in the environment and in an image displayed by the display device.

10. The data processing apparatus according to claim 1, wherein the selection circuitry selects the plurality of landmark points in dependence upon a user input with respect to at least one of the plurality of captured images and the plurality of candidate landmark points to thereby select the subset of the plurality of candidate landmark points.

11. The data processing apparatus according to claim 10, wherein the selection circuitry further selects the plurality of landmark points in a specified area including a portion of the plurality of candidate landmark points.

12. The data processing apparatus according to claim 1, wherein the image information is indicative of a size of an object detected in the one of the plurality of captured images, and wherein the selection circuitry selects candidate landmark point in dependence upon the size of the object indicated by the image information for that candidate landmark point.

13. The data processing apparatus according to claim 1, wherein the receiving circuitry obtains another image of the environment captured from another viewpoint and the mapping circuitry calculates a position and orientation of the another viewpoint with respect to the environment in dependence upon the map for the environment and one or more of the landmark points included in the another image.

14. The data processing apparatus according to claim 1, comprising one or more image sensors mounted on one of a head-mountable display device (HMD) and a robotic device to capture the plurality of images of the environment.

15. A data processing method comprising:
receiving a plurality of images of an environment captured from respective different viewpoints;

receiving a user input specifying one or more regions in at least one of the plurality of images to be excluded from analysis;

excluding the one or more regions from the at least one of the plurality of images;

after the exclusion, detecting a plurality of features points in each one of the plurality of images, wherein at least one feature point is detected in a region of the at least one image that has not been excluded;

associating image information with each one of the plurality of feature points indicative of an image property for the one of the plurality of feature points so detected within the one of the plurality of captured images after exclusion, each one of the plurality of feature points representing a candidate landmark point for mapping the environment;

selecting a subset of the plurality of candidate landmark points as a plurality of landmark points, the subset of the plurality of candidate landmark points to be used as a plurality of landmark points for use in generating a map; and generating, for the environment, the map comprising the plurality of landmark points, wherein each one of the plurality of landmark points included in the map is defined by a three dimensional position and the associated image information for that one of the plurality of landmark points.

16. A non-transitory, computer readable storage medium containing computer software which, when executed by a computer, causes the computer to carry out a method comprising:

receiving a plurality of images of an environment captured from respective different viewpoints;

receiving a user input specifying one or more regions in at least one of the plurality of images to be excluded from analysis;

excluding the one or more regions from the at least one of the plurality of images;

after the exclusion, detecting a plurality of features points in each one of the plurality of captured images, wherein at least one feature point is detected in a region of the at least one image that has not been excluded;

associating image information with each one of the plurality of feature points indicative of an image property for the one of the plurality of feature points so detected within the one of the plurality of captured images after exclusion, each one of the plurality of feature points representing a candidate landmark point for mapping the environment;

selecting a subset of the plurality of candidate landmark points, the subset of the plurality of candidate landmark points as a plurality of landmark points for use in generating a map; and generating, for the environment, the map comprising the plurality of landmark points, wherein each one of the plurality of landmark points included in the map is defined by a three dimensional position and the associated image information for that one of the plurality of landmark points.

17. The data processing apparatus according to claim 1, wherein the detection circuitry receives additional user input specifying modified regions to be excluded during ongoing mapping, and updates the plurality of feature points based on the modified regions, wherein the selection circuitry updates the plurality of landmark points for mapping based on the updated plurality of feature points, and wherein the mapping circuitry updates the map based on the updated plurality of landmark points.

18. The method according to claim 15, further comprising:

receiving additional user input specifying modified regions to be excluded during ongoing mapping;

updating the plurality of feature points based on the modified regions;

updating the plurality of landmark points based on the updated plurality of feature points; and updating the map based on the updated plurality of landmark points.

19. The non-transitory, computer readable storage medium according to claim 16, wherein the method further comprises:

receiving additional user input specifying modified regions to be excluded during ongoing mapping;

updating the plurality of feature points based on the modified regions; and updating the plurality of landmark points based on the updated plurality of feature points; and updating the map based on the updated plurality of landmark points.

20. The data processing apparatus according to claim 17, wherein the modified regions comprise a region corresponding to a reflective surface.

* * * * *